(No Model.)
L. G. BOSTEDO.
RECEIVING BOX FOR PNEUMATIC DESPATCH TUBES.
No. 564,965. Patented Aug. 4, 1896.
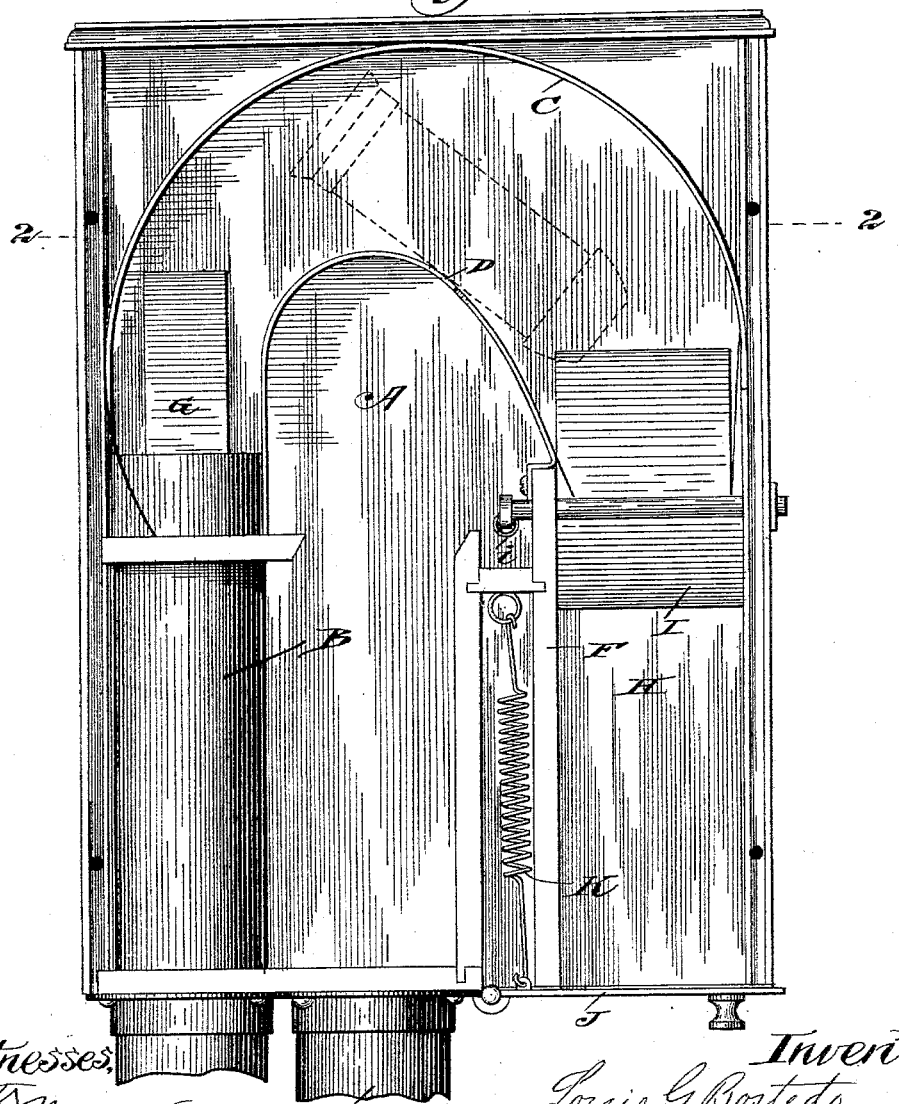

UNITED STATES PATENT OFFICE.

LOUIS G. BOSTEDO, OF CHICAGO, ILLINOIS.

RECEIVING-BOX FOR PNEUMATIC-DESPATCH TUBES.

SPECIFICATION forming part of Letters Patent No. 564,965, dated August 4, 1896.

Application filed March 9, 1893. Serial No. 465,338. (No model.)

*To all whom it may concern:*

Be it known that I, LOUIS G. BOSTEDO, of Chicago, Illinois, have invented certain new and useful Improvements in Receiving-Boxes for Pneumatic-Despatch Tubes, of which the following is a specification.

This invention relates to a cashier's receiving-box for pneumatic tubes; and the object of the invention is to provide a receiving-box which is adapted to have the carrier discharged upwardly therein and which is provided with suitable guides whereby the carrier after it emerges from the receiving-tube into the box is deflected in its course and reversed as to position and finally discharged by gravity through a compartment, the ends of which are controlled by pivoted and spring-controlled valves. A suction-tube communicates with the lower portion of the box and preferably at a point between the receiving-tube and the discharge-aperture, and the guides are so constructed that the air is exhausted at a point where it will not interfere with the movement of the carrier.

The receiving-box is so constructed and arranged that the shock of the impact is broken and the carrier is discharged without injury to the valves.

In the accompanying drawings, Figure 1 is a side elevation of the box in the position for use, the front casing removed. Fig. 2 is a sectional plan view below the line 2 2 of Fig. 1.

In the drawings, A represents the external walls of the box, which is rectangular in form.

B represents a receiving-tube which is projected through an aperture in the bottom of the box and is extended, preferably, beyond the mid-height thereof and has an open outer end.

C D represent curved guides which are secured on opposite sides of the open end of the receiving-tube. These guides are curved so as to cross the box. The guide C is fixed to the side walls and the guide D is cut away at a point beyond its middle, and its reduced end is secured to the upper end of the vertical partition F.

G represents strips which are arranged between the curved guides on opposite sides of the delivery end of the receiving-tube, so as to narrow the space and prevent the carriers from turning. The partition F divides the lower portion of the box into a smaller compartment H, the upper end of which is closed by the hinged valves I, while its lower end is fitted with the hinged door J, controlled by the spring K.

L represents a suction-tube which communicates with the interior of the box in its bottom wall and preferably between the receiving-tube and the hinged door J.

The air will be exhausted from the interior of the box through the suction-tube and the suction will act on the carrier so as to cause it to deliver through the receiving-tube with considerable force. The curved guides will deflect the carrier so as to turn it half around, the carrier being shown by the dotted lines in Fig. 1 just at the apex or highest point of the turn. From this point the carrier will discharge by gravity, the air being exhausted from the receiving-tube and passing freely through the apertures at the sides of the narrowed portion of the lower guide.

The construction is such that the discharge of the carrier is effected eventually by gravity through the hinged valves, whose function is to prevent the entrance of air to the system. The valves I will be provided with suitable controlling-springs *i*, as seen in Fig. 2, which will cause them to close behind the carrier as it descends into the compartment H, and these valves will close before the carrier has opened the door J.

This receiving-box is intended particularly for an upward discharge, and its size will be such that the moving air-current will not be impeded but may pass freely through the box, the interior portion of which, except the compartment H, is at all times sealed to the external atmosphere.

I have described and shown a compartment through which the carrier discharges having valves or doors at each end, and in some instances these are essential, but where the despatch-tube is short the upper valve may be dispensed with.

I claim—

1. A receiving box or terminal for pneumatic-despatch tubes adapted for connection with receiving and suction tubes respectively and having a curved guide forming a continuation of the receiving-tube and adapted to deflect the course of a carrier so as to carry it beyond the plane of the suction-tube and reverse its direction while passing through the box, said box having a valve-controlled discharge-aperture located in the path of the carrier beyond the plane of the suction-tube and constructed to be opened by the carrier, and said curved guide having air-passages on the discharge side and below its apex whereby the air may escape to the suction-tube, substantially as described.

2. A receiving box or terminal for pneumatic-despatch tubes and adapted for connection with an upwardly-discharging receiving-tube, a curved guide forming a continuation of the receiving-tube and adapted to deflect the carrier to the opposite side of the box and to reverse its direction while passing therethrough, a valve-controlled discharge-aperture located in the bottom of the box, the valve whereof is adapted to be automatically opened by the impact of the carrier thereon and a connection for a suction-tube also provided in the lower side of the box between the planes of the inner walls of the receiving-tube and of the discharge-opening and the curved guide having an air-passage in its discharge side and below its apex, substantially as described.

LOUIS G. BOSTEDO.

Witnesses:
C. C. LINTHICUM,
N. M. BOND.